United States Patent
Aaronson

(10) Patent No.: US 12,314,684 B2
(45) Date of Patent: May 27, 2025

(54) GENERATION OF CERTIFIED RANDOM NUMBERS USING AN UNTRUSTED QUANTUM COMPUTER

(71) Applicant: Board of Regents, The University of Texas System, Austin, TX (US)

(72) Inventor: Scott Aaronson, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 824 days.

(21) Appl. No.: 17/428,586

(22) PCT Filed: Feb. 7, 2020

(86) PCT No.: PCT/US2020/017176
§ 371 (c)(1),
(2) Date: Aug. 4, 2021

(87) PCT Pub. No.: WO2020/226715
PCT Pub. Date: Nov. 12, 2020

(65) Prior Publication Data
US 2022/0100473 A1 Mar. 31, 2022

Related U.S. Application Data

(60) Provisional application No. 62/802,664, filed on Feb. 7, 2019.

(51) Int. Cl.
*G06F 7/58* (2006.01)
*G06N 10/20* (2022.01)
*G06N 10/80* (2022.01)

(52) U.S. Cl.
CPC ............ *G06F 7/582* (2013.01); *G06N 10/20* (2022.01); *G06N 10/80* (2022.01)

(58) Field of Classification Search
CPC ......... G06F 7/582; G06N 10/20; G06N 10/80
See application file for complete search history.

(56) References Cited

U.S. PATENT DOCUMENTS

2007/0234068 A1   10/2007   Silverbrook et al.
2016/0328211 A1*  11/2016   Nordholt ................. G06F 7/588
(Continued)

OTHER PUBLICATIONS

International Search Report and Written Opinion mailed Oct. 26, 2020 in International Patent Application No. PCT/US2020/017176, 10 pages.

(Continued)

*Primary Examiner* — Michael D. Yaary
(74) *Attorney, Agent, or Firm* — Kilpatrick Townsend & Stockton LLP

(57) ABSTRACT

Classical computer systems can generate certified random bit strings using an untrusted quantum computer. The classical computer system can issue a sequence of challenges to the quantum computer, with each challenge involving execution of an apparently-random quantum circuit generated by the classical client. By executing the quantum circuits, the quantum computer can generate a high-entropy bit sequence, and the classical client can use the high-entropy bit sequence to generate sequences of random bits. The classical client can use models of quantum probability distributions for at least some of the challenges to verify that the bit sequence was generated by a quantum computer executing the quantum circuit generated by the classical client, thereby supporting certification of the randomness of the sequence of bits.

20 Claims, 4 Drawing Sheets

(56) References Cited

U.S. PATENT DOCUMENTS

| | | | |
|---|---|---|---|
| 2017/0063827 A1 | 3/2017 | Ricardo | |
| 2017/0330101 A1 | 11/2017 | Hastings et al. | |
| 2018/0189653 A1* | 7/2018 | Burchard | G06N 7/01 |

OTHER PUBLICATIONS

Aaronson, et. al., Complexity-Theoretic Foundations Of Quantum Supremacy Experiments. In Proc. Conference on Computational Complexity, 2017. arXiv:1612.05903.

Z. Brakerski, et. al., A Cryptographic Test Of Quantumness And Certifiable Randomness From A Single Quantum Device. In Proc. IEEE FOCS, pp. 320-331, 2018. arXiv:1804.00640.

M. Bremner, et. al., Classical Simulation Of Commuting Quantum Computations Implies Collapse Of The Polynomial Hierarchy. Proc. Roy. Soc. London, A467(2126):459-472, 2010. arXiv:1005.1407.

R. Colbeck. Quantum And Relativistic Protocols For Secure Multi-Party Computation. PhD thesis, Trinity College, University of Cambridge, 2009. arXiv:0911.3814.

C. Neill, et. al., A Blueprint For Demonstrating Quantum Supremacy With Superconducting Qubits. 360(6385):195-199, 2018. arXiv:1709.06678.

O. Goldreich, et. al., How To Construct Random Functions. J. of the ACM, 33(4):792-807, 1986. Earlier version in FOCS'1984, pp. 464-479.

J. Hastad, et. al., A Pseudorandom Generator From Any One-Way Function. SIAM J. Comput., 28(4):1364-1396, 1999.

J. Preskill. Quantum Computing In The NISQ Era And Beyond. Quantum, 2(79), 2019. To appear. arXiv:1801.00862.

B. M. Terhal, et. al., Adaptive Quantum Computation, Constant-Depth Circuits And Arthur-Merlin Games. Quantum Information and Computation, 4(2):134-145, 2004. quantph/0205133.

M. Zhandry, Quantum Lightning Never Strikes The Same State Twice. arXiv:1711.02276, 2017.

Application No. EP20801742.6, Extended European Search Report, Sep. 29, 2022, 6 pages.

Scott et al., "Certified Randomness from Quantum Supremacy", Beyond Crypto, XP55962580, 2018, pp. 1-20.

* cited by examiner

GENERATION OF CERTIFIED RANDOM NUMBERS USING AN UNTRUSTED QUANTUM COMPUTER

CROSS-REFERENCE TO RELATED APPLICATIONS

This application is a U.S. National Stage of PCT International Application No. PCT/US2020/017176, filed on Feb. 7, 2020, which claims the benefit of U.S. Provisional Application No. 62/802,664, filed Feb. 7, 2019, the disclosures of which (including Appendix A) are incorporated herein by reference in their entireties.

STATEMENT REGARDING FEDERALLY SPONSORED RESEARCH AND DEVELOPMENT

This invention was made with government support under Grant no. N00014-16-1-3164 awarded by the Office of Naval Research. The government has certain rights in the invention.

BACKGROUND

This disclosure relates to random number generation and in particular to certified random number generation using an untrusted quantum computer.

As used herein, a "random" number generator is a device that generates a sequence of numbers having a uniform distribution (over some finite interval), where the generation is performed using a process such that knowledge of past numbers in the sequence does not enable prediction of future numbers and such that the sequence is not repeatable (i.e., restarting the generation process from the same initial conditions does not generate the same sequence). In the context of computers, random numbers can be generated by generating a fixed-length random string, or sequence, of bits (binary digits) and interpreting the string as a number. For some applications, it is desirable that random bit sequences (or random numbers) be "certified" random, meaning that the randomness of the bit sequence can be proven to a skeptic who does not trust the device that is providing the randomness.

Quantum phenomena, such as radioactive decay or the behavior of entangled systems of multiple quantum objects (e.g., photons or ions), exhibit inherent randomness due to the non-deterministic nature of quantum mechanics. For this reason, it is appealing to use quantum phenomena as a source of randomness. However, accessing quantum randomness generally involves providing a classical device (i.e., a device whose behavior can be modeled without reference to quantum mechanics) to measure the state of a quantum system to extract random bits, and a skeptic who trusts quantum mechanics may not trust the classical device or the construction of a particular quantum device.

Therefore, systems that can exploit quantum phenomena to provide certified randomness would be desirable.

SUMMARY

This disclosure describes examples (also referred to as "embodiments") of systems and methods that can be used to generate certified random bit strings using an untrusted quantum computer. The quantum computer can be, for instance, a noisy intermediate scale quantum (NISQ) computer. NISQ computers may operate on systems of about 40-200 physical quantum bits, using a variety of quantum computing architectures and underlying quantum systems. A classical computer system, also referred to herein as a "classical client," can issue a sequence of challenges to the quantum computer, with each challenge involving execution of an apparently-random quantum circuit generated by the classical client. By executing the quantum circuits, the quantum computer can generate a high-entropy bit sequence, and the classical client can use the high-entropy bit sequence to generate (potentially large) sequences of random bits. The classical client can use models of quantum probability distributions for at least some of the challenges to verify that the bit sequence was generated by a quantum computer having the requisite degree of randomness (not spoofed by some other device), thereby providing certification of the randomness of the (potentially large) sequence of bits.

According to some embodiments, a computer system can include: a quantum circuit generator module to generate an apparently-random quantum circuit; a communication module to send the quantum circuit as a challenge to a quantum server that includes a quantum computer and to receive a response to the challenge from the quantum server, wherein the response includes a result string representing output from executing the quantum circuit on the quantum computer and wherein the communication module requires the response within a time limit that is sufficiently short to preclude spoofing of the quantum computer; a verification module to determine whether to accept that a set of received responses was generated by using the quantum computer to execute the quantum circuit, wherein the determination is based on a set of received responses to a plurality of challenges for each of a plurality of quantum circuits generated by the quantum circuit generator module, and wherein the determination includes a classical simulation of each of the plurality of quantum circuits; and a randomness extraction module to generate a random bit sequence using one or more of the result strings.

According to some embodiments, a method for generating certified random numbers can include: obtaining, at a classical client computer system, a random seed; conducting, by the classical client computer system, a plurality of challenge rounds with a quantum server that includes a quantum computer, wherein conducting each challenge round includes: generating an apparently-random quantum circuit using a first portion of the random seed; instructing the quantum server to execute the quantum circuit on the quantum computer a number (k) of times; and receiving from the quantum server, within a time limit, a set of k result strings representing output of the quantum computer from each execution of the quantum circuit, wherein the time limit is sufficiently short to preclude spoofing of the quantum computer; performing, by the classical client computer system, a verification test on the k result strings received during each challenge round of a subset of the challenge rounds that includes a number ($T_v$) of the challenge rounds, wherein performing the verification test includes: determining a probability score for each of the challenge rounds in the subset based on a probability of receiving each result string from an error-free quantum computer; and comparing the probability score to a threshold; and in the event that the verification test succeeds, using, by the classical client computer system, at least one of the result strings received during the plurality of challenge rounds to generate one or more certified random numbers.

The following detailed description, together with the accompanying drawings, will provide a better understanding of the nature and advantages of the claimed invention.

DETAILED DESCRIPTION

Figure 1:
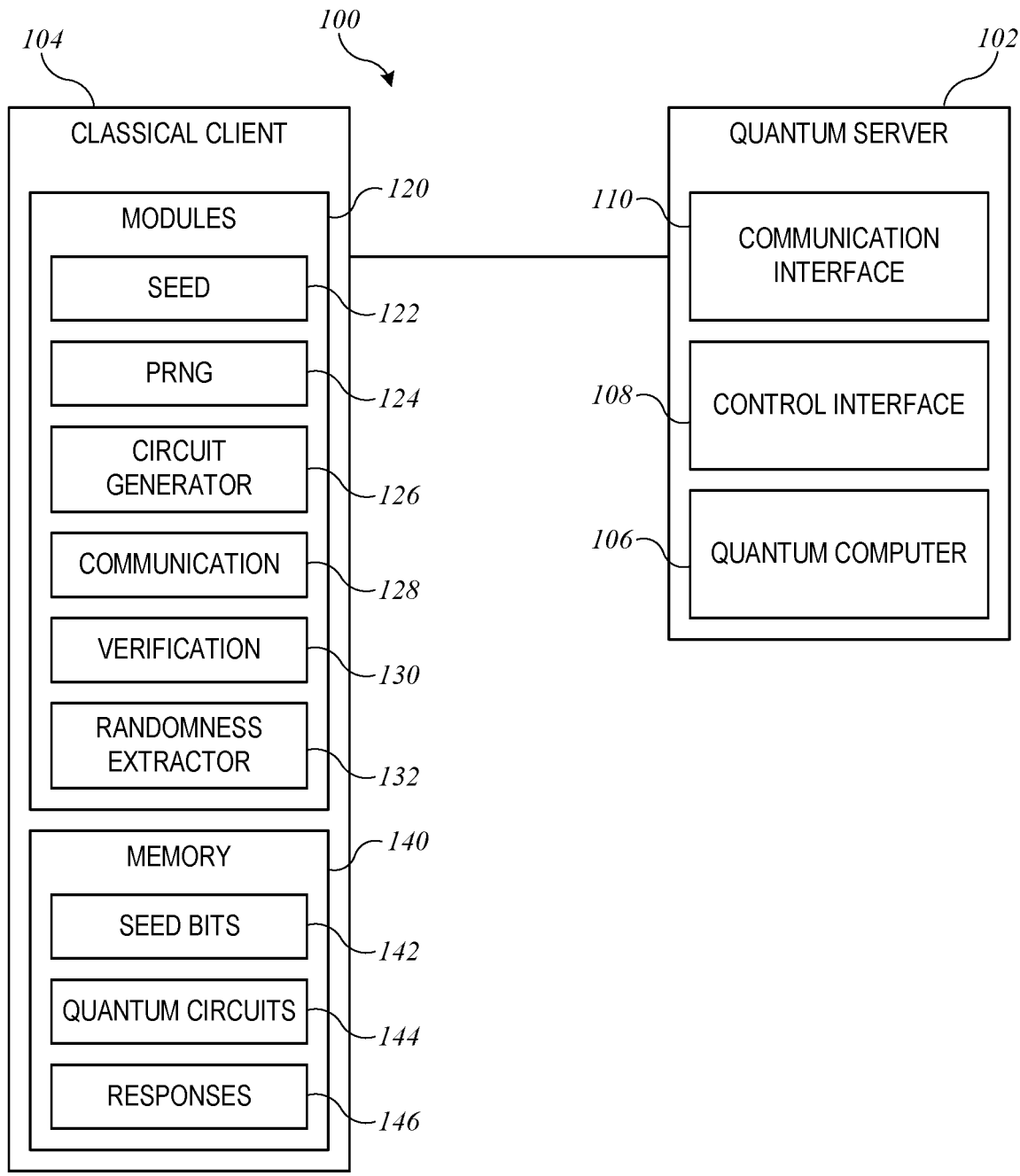
FIG. 1 shows a simplified block diagram of an embodiment of a client-server system.

Systems and methods described herein can generate certified random numbers by exploiting the inherent randomness of a quantum computer. As used herein, the term "quantum computer" refers to any device or system that controllably performs programmable sequences of operations on an ensemble of quantum systems (referred to as qubits), where the operations are such that the behavior of the qubits can be modeled using quantum mechanics but not using purely classical mechanics. More specifically, a quantum computer can include any device or system that is operable to apply a quantum circuit (a programmable sequence of unitary transformation and/or measurement operations, also referred to as "gates") to an ensemble of physical qubits. The qubits can be realized using physical systems (e.g., ion traps, photons, or other entities or systems of entities) that have a state space that can be modeled in two dimensions and that are capable of forming entangled quantum states with each other. Typically, one measurement basis in the two-dimensional state space of a qubit is identified as the logical basis, and the two basis states in the logical basis are mapped to the "logical-0" and "logical-1" states of the qubit. In operation, a quantum computer receives as inputs a program, or sequence of gates, to be executed and an initial state for the ensemble of qubits (in some instances, the initial state is inherent in the design of the quantum computer). The quantum computer can provide classical outputs, including a result string, which can be a sequence of bits (binary digits) representing the logical state of each qubit as measured at the end of program execution. Due to the inherent randomness of quantum physics, a result string can be expected to include some degree of randomness (although it is generally not purely random). A quantum computer can be susceptible to "noise," i.e., various environmental effects that may perturb the quantum system and introduce error into a computation.

In embodiments described herein, it is assumed that the quantum computer is controlled and operated at the direction of a "quantum server," which can be a classical computer system that inputs instructions (or programs) to and extracts result strings from the quantum computer. (The term "classical" is used herein to refer to computer systems whose behavior can be modeled without reference to quantum mechanics.) Other computer systems, referred to herein as "classical clients," can communicate with the quantum server to provide instructions (e.g., programs specifying operations to execute on the qubits) and to receive responses (including result strings representing the final logical state of each qubit). It is also assumed that the classical client has no a priori assurance that the quantum server is honest, i.e., that any responses received from the quantum server were in fact generated using a particular type of quantum computer in the specified way (i.e., by executing the program as instructed) and not by some other process that does not produce sufficiently high-entropy output sequences. Accordingly, the quantum server can be described as "untrusted."

Described herein are examples (also referred to as "embodiments") of systems and methods for using an untrusted quantum server to generate certified random numbers. These systems and methods can incorporate verification (or certification) techniques that can be used to verify, with a level of confidence selected by a classical client (or an operator thereof), that the responses from the quantum server contain a requisite amount of randomness, which as a practical matter implies that they were in fact generated using a quantum computer to execute a program specified by the classical client and not by some device or process attempting to spoof the quantum computer. This can be accomplished by requiring that a randomly-selected subset of the responses satisfy a condition that a quantum computer of the purported type can easily satisfy but that other computers (e.g., classical computers) would not be expected or able to satisfy.

In some embodiments, the verification procedure is based on the quantum computer's ability to solve the so-called "Heavy Output Generation" problem. Specifically, the classical client instructs the quantum server to execute, using its quantum computer, an apparently-random quantum circuit C (generated by the classical client) on an ensemble of n qubits initialized to a known state (e.g., all qubits in the logical-0 state). The classical client requires that the quantum server return the result of the quantum computation within a time limit short enough to effectively foreclose the possibility of simulating the quantum circuit using a classical computer. The classical client instructs the quantum server to repeat the execution a number k of times to generate a set of k result strings $s_j$ (for j=1, k). The classical client computes the probability $Pr(s_j|C)$ that an honest, error-free quantum computer would produce each result string $s_j$, given circuit C, and requires that the outputs satisfy $$\sum_{j=1}^{k} Pr(s_j | C) \geq \frac{bk}{2^n}, \qquad (1)$$

where b is a confidence parameter in the range $1 \leq b \leq 2$. The specific value of b can be chosen to reflect the desired degree of confidence and the (assumed) amount of noise in the quantum computer. For instance, b=1 sets a threshold corresponding to pure chance (which would do nothing to detect spoofing of the quantum computer by some other process), and b=2 sets a threshold corresponding to a perfect (noise-free) quantum computer, which may lead to a high rate of false negatives (i.e., a real quantum computer failing to satisfy Eq. (1)), particularly for a noisy quantum computer.

It should be understood that, due to the probabilistic nature of quantum mechanics and the nature of statistical sampling, even a perfect (non-noisy) quantum computer would not be expected to satisfy Eq. (1) for every set of k result strings (even if b is set to 1). Accordingly, in some embodiments, Eq. (1) can be tested for a number $T_v$ of different quantum circuits $C_i$ (for i=1, . . . , $T_v$), and a pass-fraction f can be computed as $$f = \frac{N_P}{T_v}, \quad (2)$$

where $N_P$ is the number of quantum circuits $C_i$ (out of the $T_v$ circuits tested) for which Eq. (1) was satisfied. In embodiments where Eq. (2) is used, verification can be considered successful if $$f \geq f_{min}, \quad (3)$$

where the threshold $f_{min}$ can be selected based on a desired degree of confidence, and unsuccessful otherwise. Use of multiple quantum circuits and a pass fraction can be helpful for avoiding false positives, as a classical computer or other system could randomly generate one set of k result strings $s_j$ that happen to satisfy Eq. (1) but would not be expected to do so consistently. Use of multiple quantum circuits and a pass fraction can also be helpful for avoiding false negatives, as a quantum computer (noisy or otherwise) can be expected to satisfy Eq. (1) more often than not for an appropriate choice of parameter b.

The particular choice of parameters n, k, b, $T_v$, and $f_{min}$ depends on the particular implementation. For example, determining $Pr(s_j|C)$ using a classical computer is a non-trivial computational task that involves a full simulation of the quantum circuit (which requires $\sim 2^n$ time), from which probabilities of various result strings $s_j$ can be extracted. As a practical matter, this may lead to an upper limit on the number n of qubits, depending on the computing power available to the classical client and the tolerance for slow verification in a particular use-case. With presently-available classical computer systems, the computation of $Pr(s_j|C)$ is tractable for quantum computers of up to about 70 or 80 qubits; as it happens, quantum computers of this scale are in development and expected to be available in the near future. In addition, increasing the number of quantum circuits $T_v$ (for a given $f_{min}$) increases reliability of the verification process but also requires more instances of quantum circuit simulation, which can further slow the verification process. The optimum choices of b, k, and $f_{min}$ depend in part on how noisy the particular quantum computer is assumed to be: a relatively noisy quantum computer is more likely than an error-free quantum computer to produce an improbable result, suggesting larger k and/or lower b. Optimum choices of b, k, and $f_{min}$ also depend in part on the desired degree of confidence in the verification. For instance, increasing values of b, k, and/or $f_{min}$ may decrease false positives but may also increase false negatives.

In some embodiments, the selection of parameters can be based on consideration of the amount of entropy extractable per "round" (i.e., per execution of the same quantum circuit C a number k of times, yielding n×k result bits) and the difficulty of spoofing the quantum computer. For example, suppose that the quantum computer satisfies Eq. (1) with probability q (which can be the same as $f_{min}$) for a given setting of parameters b and k. Then, following a theoretical analysis, the number (H) of nearly-random (or min-entropy) bits that can safely be extracted per round approaches a limit of $$H \to \log_2 L \times \frac{bq-1}{b-1}, \quad (4)$$

where L is defined as the number of time steps assumed to be needed to solve a computational problem closely related to spoofing the quantum computer.

Under the maximally aggressive assumption that $L=2^n$ (i.e., that spoofing should take $\sim 2^n$ time), Eq. (4) becomes:

$$H \to n \times \frac{bq-1}{b-1}, \quad (5)$$

which implies that the limit on randomness per sample (i.e., per single execution of a quantum circuit is)

$$\sim \frac{n}{k} \times \frac{bq-1}{b-1}, \quad (6)$$

Eq. (6) suggests that increasing the probability q of the quantum computer satisfying Eq. (1) (e.g., by decreasing b) provides a greater number of random bits per round. Further, in order to extract any randomness at all, the condition q>1/b needs to be satisfied. Per Eq. (1), q increases as b decreases, and if b is sufficiently small, then q also increases as k increases (due to the Law of Large Numbers). Therefore, to compensate for noise in the quantum computer, b can be decreased to a value close to 1 (e.g., to 1.01), and k can be increased as needed to satisfy q>1/b, allowing at least some randomness to be extracted. Increasing k may make the protocol less efficient; however, certified randomness generation using techniques of the kind described herein can be implemented as long as noise in the quantum computer is low enough that the condition q>1/b can be satisfied.

It is also noted that, given enough time, a classical computer system or some other device can be used to simulate (or "spoof") the quantum computer by generating a set of result strings that satisfy Eq. (1) through some process other than actually executing the quantum circuit on an ensemble of n qubits. To preclude spoofing of the quantum computer, some embodiments described below require that the untrusted quantum server provide its result strings within a time limit $\tau_{max}$ after receiving the instruction to execute the quantum circuit. The time limit $\tau_{max}$ can be chosen to be long enough to allow the quantum computer to execute the quantum circuit and to communicate with the classical client but not long enough to allow spoofing of the quantum computer by some other device. For purposes of determining a time limit that is sufficiently short to preclude spoofing, assumptions are made about the computational hardness of spoofing the quantum computer. For instance, the time needed to spoof the quantum computer using a classical computer can be estimated based on the number of computations required to simulate the quantum circuit using a classical computer and the number of computations per second that known classical computers can perform. In some embodiments, the time limit can be at least three orders of magnitude less than the time that is believed to be required for spoofing by currently-existing classical computers. Since the time limit should also be long enough to allow for communication between the quantum server and the classical client, the requirement for a time limit that is orders of magnitude less than the time that is believed to be required for spoofing may also imply lower limits on the size of the quantum computer (i.e., number of qubits) and/or the complexity of the quantum circuit.

Further considerations related to the selection of various parameter values to provide a desired degree of trustworthiness are described below.

Examples of systems and methods for generating certified random numbers using a quantum computer will now be described.

FIG. 1 shows a simplified block diagram of an embodiment of a client-server system 100. System 100 includes a quantum server 102 communicatively coupled to a classical client 104.

Quantum server 102 can include a quantum computer 106, a control interface 108, and a communication interface 110. Quantum computer 106 can be any type of quantum computer that operates in the manner described above on an ensemble of a number n of qubits. In some embodiments, quantum computer 106 can be a noisy intermediate scale quantum computer (NISQ) that supports an ensemble of about 40-200 physical qubits (hence "intermediate scale") with a coherence time long enough to perform quantum computations that nontrivially entangle all of the qubits. The particular number n of qubits is not critical, provided that n is large enough to rule out spoofing (given a time limit $\tau_{max}$ and assumptions about the computational capabilities of a possible spoofer as described above). In general, larger numbers n imply a need for more computing power in classical client 104 but provide more security against spoofing. In addition, larger numbers n can allow more random bits to be generated per quantum circuit. In some embodiments, n can be in the range of about 40-80 qubits. Quantum computer 106 can be noisy, in the sense that operations on the qubits have a nonzero error rate due to environmental influences that may perturb the quantum state of the qubits. (The particular error rate and sources of error are not critical to understanding the present disclosure.) Numerous examples of suitable systems to implement quantum computer 106 are currently being developed and have been publicly disclosed. A 54-qubit superconducting chip (known as "Sycamore") recently announced by Google's Quantum AI Lab is one example, but the present disclosure is not limited to any specific implementation of quantum computer 106.

Quantum computer 106 can operate under the direction of control interface 108. Control interface 108 can be, for example, a classical computer that can read an input program specification (e.g., a sequence of gates) and cause quantum computer 106 to execute the specified program (e.g., by transforming and/or measuring qubits in the ensemble according to the sequence of gates). Control interface 108 can also read out a result at the end of program execution, e.g., by causing quantum computer 106 to measure the logical state of each qubit and generating a bit sequence representing the measured logical states.

Communication interface 110 can enable communications between quantum server 102 and other devices and/or users. For example, communication interface 110 can support network connections to a local area network and/or to a wide area network such as the internet. Communication interface 110 and/or control interface 108 can also allow a local administrator (e.g., a person employed by the entity that owns quantum server 102) to monitor and/or direct operations of quantum computer 106.

Classical client 104 can be implemented using a computer system of generally conventional design and can include one or more processors that can be programmed to implement classical binary logic circuits, memory devices to store data and program code, network communication interfaces, user interfaces, and so on. In some embodiments, classical client 104 implements a number of logic circuits (referred to herein as "modules") 120. Modules 120 can be implemented, e.g., using (classical) program code that is stored in a memory of classical client 104 and executed by a processing subsystem of classical client 104. Alternatively, some or all of modules 120 can be implemented using dedicated logic circuitry. In some embodiments, modules 120 can include a seed module 122 to generate a relatively short random seed; a pseudorandom number generator (PRNG) module 124 to generate a sequence of pseudorandom bits from a seed; a circuit generator module 126 to generate apparently-random quantum circuits from pseudorandom bit strings; a communication module 128 to send quantum circuits as challenges to quantum server 102 and to receive and manage responses received from quantum server 102; a verification module 130 to assess whether to accept that the received responses were generated by quantum computer 106 (as opposed to some other type of generator); and a randomness extractor 132 to generate a random bit sequence using received responses from quantum server 102. Operation of modules 120 is described in detail below.

Classical client 104 can also include a memory subsystem 140 to store data generated by modules 120. In some embodiments, examples of data that can be stored in memory subsystem 140 include seed bits 142, which can be produced by seed module 120; quantum circuits 144, which can be generated by quantum circuit generator 126; and responses 146, which can be received via communication module 128 and stored for subsequent use. Memory subsystem 140 can also store any other data that may be produced by or otherwise provided to classical client 104.

According to some embodiments of a system for generating certified randomness, classical client 104 can use quantum server 102 as a source of randomness, and classical client 104 can verify or certify (to an implementation-specific confidence level) that result strings received from quantum server 102 were generated by quantum computer 106 (and not by a classical impostor) and therefore incorporate quantum randomness. Examples of specific processes for generating certified random bit sequences using a system such as system 100 will now be described.

Figure 2:
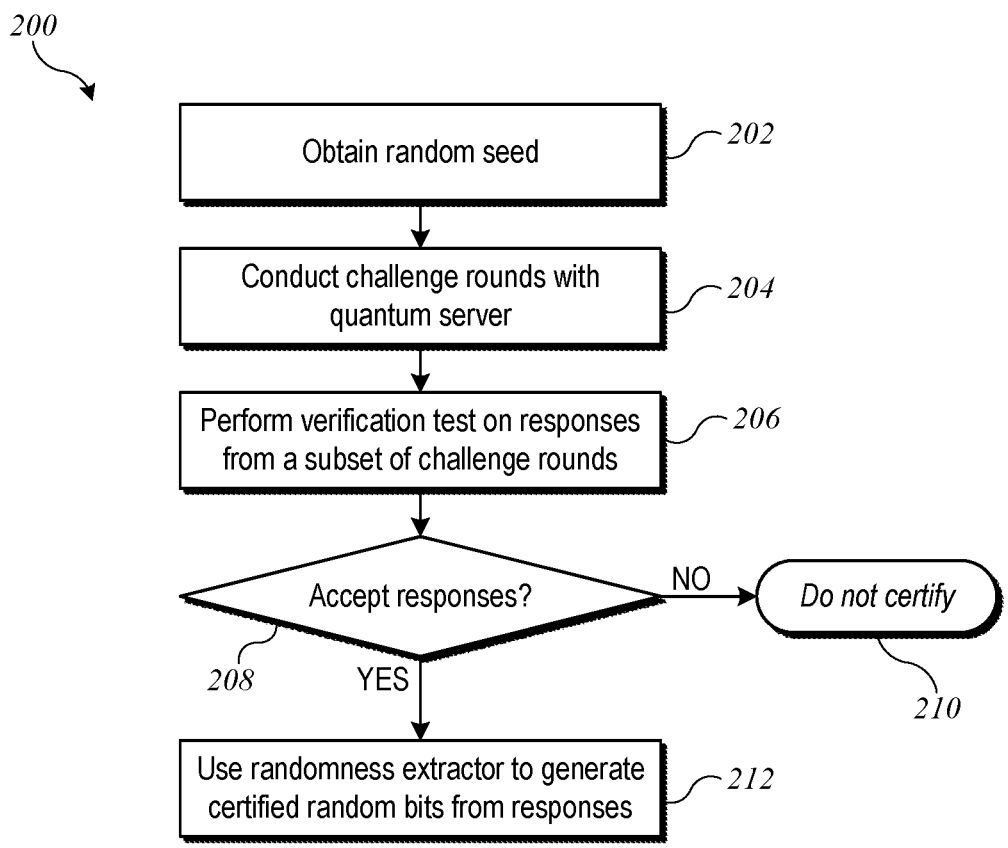
FIG. 2 is a high-level flow diagram of an embodiment of a process for generating certified random bit sequences.

FIG. 2 is a high-level flow diagram of an embodiment of a process 200 for generating certified random bit sequences. Process 200 can be implemented, e.g., using modules 120 of classical client 104 of FIG. 1. Process 200 can begin at block 202, where a random seed is obtained, e.g., by seed module 122. The random seed can be obtained using any technique that generates a truly random seed, including conventional techniques (e.g., seeding based on system time) or any other techniques that provide true randomness. The seed length in a given implementation can be chosen based on the number of qubits in quantum computer 106 and the number of output random bits that process 200 will be used to produce. It should be understood that the seed length can be much shorter than the number of output random bits. The seed can be stored by classical client 104, e.g., as seed bits 142.

At block 204, classical client 104 can conduct a number of "challenge rounds" with quantum server 102. The number of challenge rounds can be selected at the outset based on the desired length of the output random bit sequence and the desired verification accuracy. In each challenge round, classical client 104 generates an apparently-random quantum circuit to be executed on an ensemble of a fixed number (n) of qubits, sends the apparently-random quantum circuit to quantum server 102 to be executed by quantum computer 106 a specified number (k) of times, and receives in response a set of k result strings $s_1$, each of which contains n bits.

Figure 3:
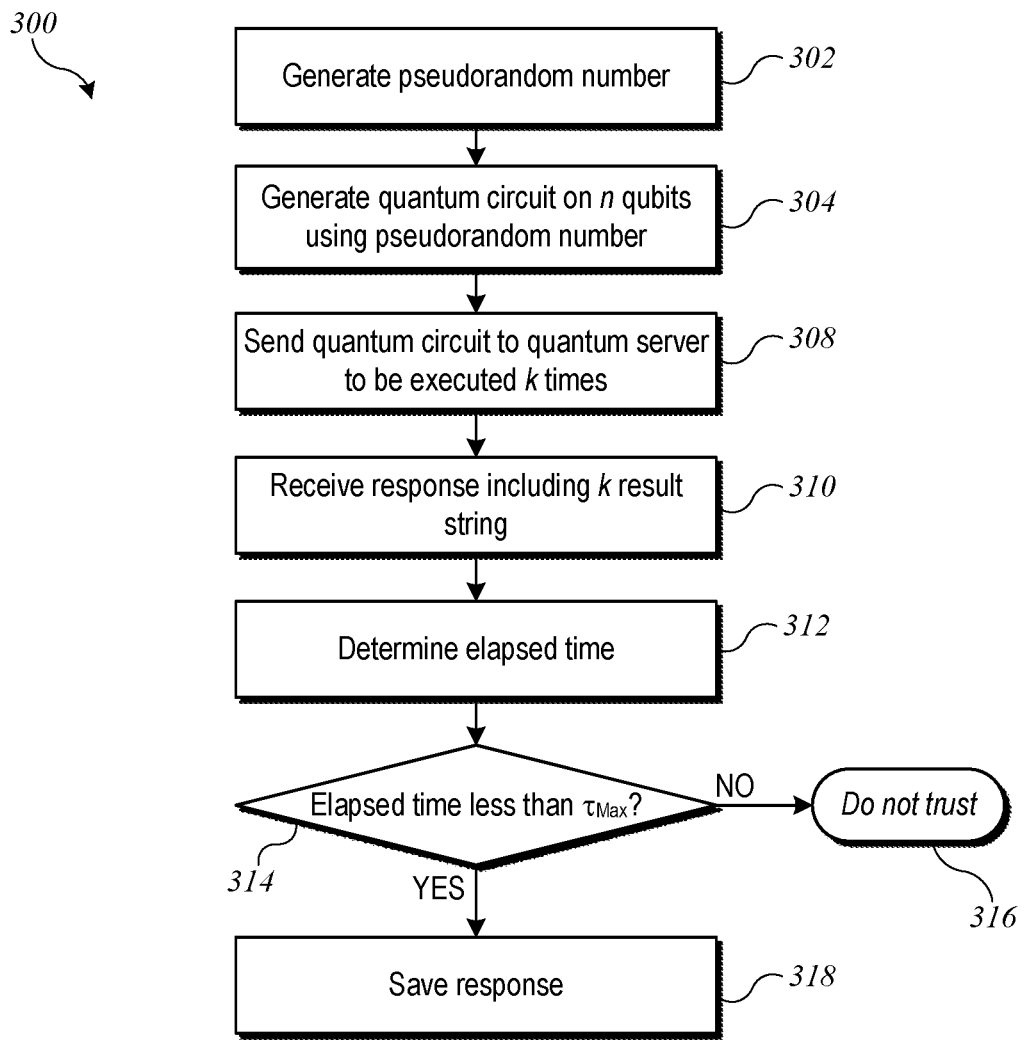
FIG. 3 is a flow diagram showing an example of a process for conducting a challenge round that can be implemented in some embodiments.

FIG. 3 is a flow diagram showing an example of a process 300 for conducting a challenge round that can be implemented at block 204 of process 200. At block 302, a pseudorandom number can be generated, e.g., using PRNG module 124. PRNG module 124 can implement any type of pseudorandom number generator, including but not limited to conventional techniques. In some embodiments, PRNG module 124 can be seeded using the random seed that was generated at block 202 (or a portion thereof), and sequences of pseudorandom numbers can be generated iteratively. The pseudorandom number generator can be selected as desired, provided that the outputs of the pseudorandom number generator are not predictable to quantum server 102. In some embodiments, PRNG module 124 can be re-seeded from time to time with a new random seed from seed module 122.

At block 304, a quantum circuit C having an appearance of randomness can be generated, e.g., using circuit generator module 126. In some embodiments, circuit generator module 126 can use one or more pseudorandom numbers generated by PRNG 124 to generate apparently-random unitary operators to apply to an ensemble of n qubits. The particular technique for generating the unitary operators may depend on the particular architecture of quantum computer 106. For instance, quantum computer 106 may have an architecture that operates on its ensemble of n qubits using a series of "layers," where each layer applies one or more two-qubit gates (each of which corresponds to a unitary transformation) to neighboring pairs of qubits; for n qubits, up to n/2 gates can be applied per layer, and different layers can pair the qubits differently to allow entanglement of all n qubits. Each two-qubit gate can be represented mathematically as a 4×4 unitary matrix, and known techniques can be used to generate an arbitrary 4×4 unitary matrix for each pair of qubits at each layer based on a pseudorandom number. The number of layers, or circuit depth (denoted herein as d), can be fixed, or it can be chosen case-by-case within a range that may be limited at the low end by the desire to preclude spoofing and the desire to entangle all n qubits (typically resulting in number of layers at least equal to the number of nearest-neighbor "hops" needed to cross the entire qubit array, which is n−1 for a linear array of qubits and approximately $\sqrt{n}$ for qubits arrayed in a two-dimensional grid) and at the high end by the coherence time of the qubit ensemble. In one example, quantum computer 106 has 53 qubits, and the number of layers is fixed at 30. For other quantum-computer architectures, other techniques for generating quantum circuits can be used. The number of qubits, layers, or gates can be selected as desired, subject to the consideration that the resulting set of quantum operations should be difficult or impossible to simulate within a time limit ($\tau_{max}$, as described below) using a classical computer. It should be noted that the quantum circuit generated at block 304 need only be "apparently" random, meaning that it is unfeasible for quantum server 102 (which is presumed not to know the seed) to predict the next quantum circuit C that will be sent. Other techniques may be used to generate an apparently-random quantum circuit C. In some embodiments, each quantum circuit C that is generated at block 304 can be stored, e.g., in quantum circuit memory 144, for use in verification operations as described below.

After generating the quantum circuit C, process 300 can instruct quantum server 102 to execute the quantum circuit C on quantum computer 106 a number (k) of times, where k is a positive integer. (Considerations for selecting the value of k are described above.) For instance, at block 308, the quantum circuit C generated at block 304 can be sent to quantum server 102 with an instruction to execute the quantum circuit k times, e.g., using communication module 128. The request can include a descriptor of the quantum circuit and an initial state for the n-qubit ensemble (e.g., all qubits in the logical-0 state). The particular details depend on the communication protocols supported by a given quantum server 102, including protocols related to specifying a quantum circuit configuration.

In response to the request, quantum server 102 executes the quantum circuit C the requested number (k) of times. For example, for each execution, quantum server 102 can configure quantum computer 106 to initialize an n-qubit ensemble to the specified initial state (e.g., all qubits in the logical-0 state), execute the quantum circuit C on the n-qubit ensemble, then measure the logical state of each qubit, thereby producing an n-bit result string $s_1$. It should be understood that the result string is inherently non-deterministic, due to the quantum behavior of quantum computer 106; as a result, different instances of execution will produce different result strings, even in the absence of noise. Any noise to which quantum computer 106 is susceptible may increase the randomness of the result strings. It should also be understood that the internal operation of quantum server 102, including whether quantum computer 106 was actually used to generate the result string, can be opaque to classical client 104.

At block 310, classical client receives the response from quantum server 102, e.g., via communication module 128. The response can include the k result strings $s_1$ produced by the k instances of executing quantum circuit C.

At block 312, communication module 128 can determine an elapsed time between sending the request (at block 308) and receiving the response (at block 310), and at block 314, communication module 128 can determine whether the elapsed time is less than a time limit ($\tau_{max}$). The time limit $\tau_{max}$ can be selected in advance of any communication with quantum server 102 and can be defined to allow sufficient time for quantum computer 106 to execute the quantum circuit k times but not sufficient time to allow some other device to spoof the quantum computer executing the quantum circuit; the time limit can also take into account any expected communication latency between classical client 104 and quantum server 102. By way of example, the "Sycamore" chip mentioned above requires about 0.01 second to configure the circuit and prepare the initial qubit state and about 10 microseconds to execute the circuit and measure the resulting qubit states. Network latency for standard internet traffic can be on the order of 1 second. Thus, in some embodiments, time limit $\tau_{max}$ may be dominated by expected communication latency and can be at least three orders of magnitude shorter than the time believed to be required to spoof the quantum computer. For instance, if the number of qubits and complexity of the quantum circuit is large enough that simulation by a classical computer is believed to require times on the order of hours (or longer), then time limit $\tau_{max}$ can be set to a few seconds (e.g., 2 seconds). For more direct connections (e.g., a point-to-point or local area network connection), communication latency may be shorter and time limit $\tau_{max}$ can be set to a shorter value (e.g., 0.1 second or 0.5 second).

In some embodiments, if it is determined at block 314 that the elapsed time exceeds time limit $\tau_{max}$, classical client 104 can determine not to trust quantum server 102 and process 300 can end at block 316. In some embodiments, this determination can result in ending process 200 with the result that no random numbers are generated.

If, at block 314, the elapsed time does not exceed $\tau_{max}$, then at block 318, the result strings $s_j$ received from quantum server 102 can be stored, e.g., in responses memory 146, along with information associating the result string $s_j$ with the particular quantum circuit C that was used to generate $s_j$. At this point, process 300 can end.

Process 300 is illustrative, and variations and modifications are possible. For instance, in some embodiments, classical client 104 can send k execution requests sequentially to quantum server 102 and receive k responses, each including one of the result strings $s_j$. A maximum allowed response time $\tau_{max}$ for each request can be established based on the time needed for quantum computer 106 to complete a single execution of the quantum circuit.

As noted above, although process 300 results in executing the same quantum circuit k times, the k result strings $s_j$ are not expected to be the same. Quantum randomness is expected to result in at least some of the n qubits having a final logical state that is different for different instances of execution. In addition, in embodiments where quantum computer 106 is noisy, the k result strings may also differ from each other due to noise effects.

Referring again to FIG. 2, process 300 corresponds to a single challenge round at block 204. Any number of challenge rounds can be performed by repeating block 204 (or process 300) using a different apparently-random quantum circuit ($C_i$) for each round i. Quantum circuits and associated result strings from each round can be saved in quantum circuits memory 144 and responses memory 146. Since the pseudorandom number (or numbers) changes from one challenge round to the next, the quantum circuit also changes, and there is expected to be no correlation between result strings $s_j$ generated using different quantum circuits $C_i$.

At block 206, a (probabilistic) verification test can be performed on results from a subset of the challenge rounds, e.g., using verification module 130. In some embodiments, the verification test can include computing a classical simulation of the quantum circuit for a particular challenge round, using the classical simulation to determine the probability of the received responses, and making verification decisions based on the probabilities, e.g., using Eqs. (1)-(3) above.

Figure 4:
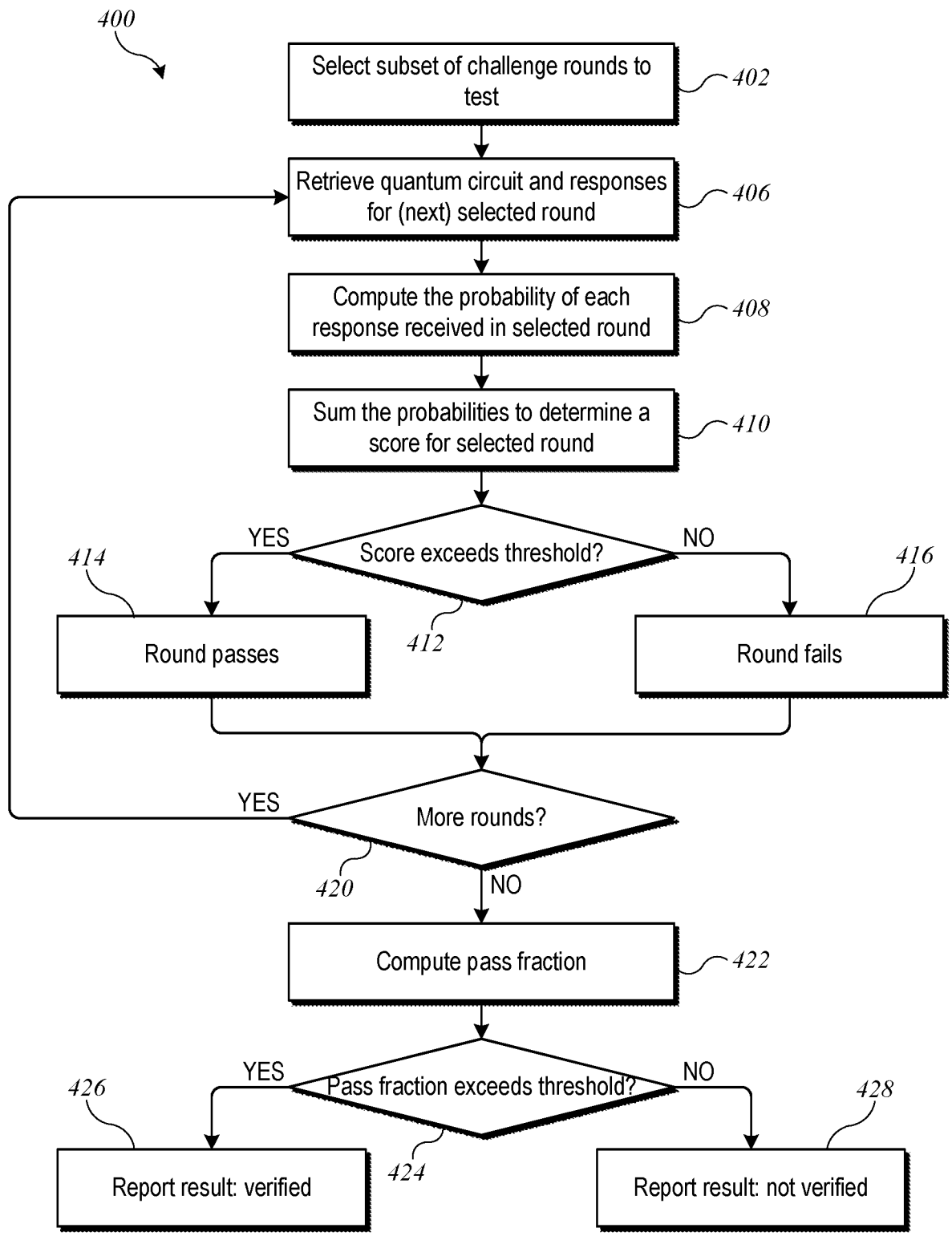
FIG. 4 is a flow diagram showing an example of a process for verification testing that can be implemented in some embodiments.

FIG. 4 is a flow diagram showing an example of a process 400 for verification testing that can be implemented at block 206 of process 200, e.g., using verification module 130. Process 400 can include selecting a number ($T_v$) of challenge rounds to test and computing Eqs. (1)-(3) above using preselected values of the confidence parameters b and $f_{min}$. ("Preselected" in this context indicates that values of b, $f_{min}$, and $T_v$ can be selected in advance of execution of process 200, with the selection based on the particular quantum computer 106 and desired confidence level as described above and further elaborated below.)

At block 402 a subset consisting of $T_v$ of the challenge rounds is selected for testing. In some embodiments, the selection is made randomly (e.g., using the seed produced at block 202 and a uniform distribution) or pseudorandomly. Random or pseudorandom selection of challenge rounds to test can prevent quantum server 102 from predicting which challenge rounds will be used for verification process 400.

At block 406, a first challenge round (denoted by index i) is selected from the subset of $T_v$ challenge rounds, and the quantum circuit $C_i$ and result strings (4, for j=1, k) for the selected challenge round are retrieved from memory 140. At block 408, verification module 130 can compute the probability $Pr(s_j^i | C_i)$ of receiving each of the responses, assuming that quantum server 102 was honest (i.e., it actually generated the responses by executing quantum circuit $C_i$ on a quantum computer) and error-free. Block 408 can include mathematically simulating the operations of the quantum circuit that was used to generate the results (which can consume $\sim 2^n$ time). At block 410, verification module 130 can compute a probability score $P_i$ for challenge round i as:

$$P_i = \sum_{j=1}^{k} Pr(s_j^i | C). \quad (7)$$

At block 412, verification module 130 can determine whether the probability score $P_i$ is at least equal to a threshold $bk/2^n$, as per Eq. (1) above. At block 414, if the probability score $P_i$ is at least equal to the threshold, the challenge round i is counted as passed (e.g., by incrementing a counter $N_P$ that counts passed rounds); otherwise, the round is counted as failed at block 416. (It should be understood that the case where $P_i$ is equal to the threshold may be treated as either passed or failed as a matter of design choice.)

At block 420, process 400 can determine whether more challenge rounds remain to be tested. If so, process 400 can return to block 406 to select the next challenge round to test.

Once all selected challenge rounds have been tested, at block 422, process 400 can compute a pass fraction, e.g., $f=N_P/T_v$, where $N_P$ is the number of challenge rounds that were counted as passed at block 414 and $T_v$ is the total number of rounds tested. At block 424, a determination is made as to whether the pass fraction is at least equal to the preselected threshold $f_{min}$, as per Eq. (3) above. At block 426, if the pass fraction exceeds the threshold, then verification module 130 can report a "verified" result. At block 428, if the pass fraction does not exceed the threshold, then verification module 130 can report a "not verified" result. (It should be understood that the case where $f=f_{min}$ may be reported as either verified or not-verified as a matter of design choice.) It should also be understood that a "fail fraction" can be substituted for a pass fraction, since requiring a fail fraction to be less than an upper limit is mathematically equivalent to requiring a pass fraction to be at least equal to a lower limit.

Referring again to FIG. 2, at block 208 of process 200, a determination is made whether to accept the responses received from quantum server 102 for use in generating random numbers. For example, the responses can be accepted if verification module 130 reports a "verified" result (block 426 of process 400) and rejected if verification module 130 reports a "not-verified" result (block 428 of process 400). If the responses are not accepted, then at block 210, classical client 104 can determine not to certify quantum server 102, which may result in not generating random numbers. (Alternatively, random numbers can be generated, but they would be identified as uncertified.)

If the results are accepted, then at block 212, classical client 104 can use the responses to generate certified random bits, e.g., using randomness extractor 132. In some embodiments, randomness extractor 132 can implement a seeded randomness extractor such as that of Guruswami, Umans, and Vadhan (or any other seeded randomness extractor). A seeded randomness extractor can take as input a large string of bits containing high entropy and a small seed that is perfectly or near-perfectly random and can output a bit sequence that is close to perfectly random. The length of the output bit sequence depends on the lengths of the high-entropy bit string and the seed. In some embodiments, randomness extractor 132 can use a portion of the seed obtained at block 202 (or another seed provided by seed module 122) as the random seed and one or more of the result strings received from quantum server 102 as the high-entropy bit string. Depending on implementation, the input to the seeded randomness extractor can include all of the result strings, one or more of the result strings, a portion of one result string, or portions of two or more result strings. Randomness extractor 132 can select result strings in any manner desired, which can but need not correspond to the order in which the result strings were obtained from quantum server 102, and the result strings selected by randomness extractor 132 can be from any challenge round, including challenge rounds that were not selected for testing by verification module 130. Any of the result strings received from quantum server 102 (up to and including all of the result strings) can be provided to randomness extractor 132.

In an alternative implementation, randomness extractor 132 can implement a non-seeded randomness extractor (examples of which are known in the art). Unlike seeded randomness extractors, non-seeded randomness extractors generally require two (not just one) independently-generated large bit strings containing high entropy. To obtain two such bit strings, classical client 104 can perform the challenge and verification processes described herein independently using two different quantum computers; however, this would effectively double the computational load associated with the challenge and verification process, which could reduce throughput. Further, the classical client would need assurances that the two quantum computers are not able to communicate with each other.

It should be understood that process 200 is illustrative and that variations and modifications are possible. For instance, operations associated with different blocks can be performed sequentially or in parallel, and order of operations can be varied to the extent that logic permits. As one example, verification of one challenge round can be performed while other challenge rounds are still in progress. Process 200 can continue indefinitely to generate a random bit sequence of any length desired, with verification operations performed periodically (or at randomly selected intervals) to confirm that quantum server 102 continues to behave as expected. New seeds can be generated at block 202 as desired.

Any subset of challenge rounds (including as few as one challenge round or as many as all of the challenge rounds) can be selected for use in the verification process. Increasing the fraction of the challenge rounds used in the verification process can provide higher reliability but can also result in slower verification (due to the need to simulate a larger number of quantum circuits). It is assumed that, when responding to a challenge, quantum server 102 cannot determine whether that response will be used for verification. Accordingly, the same number k of executions per challenge round can be requested, regardless of whether a given challenge round is to be used for testing.

In some embodiments, classical client 104 (or specific modules thereof) can be implemented using computer systems of generally conventional design. Such systems may include one or more processors that execute program code using binary logic circuitry (e.g., general-purpose microprocessors usable as a central processing unit (CPU) and/or special-purpose processors such as graphics processors (GPUs) that may provide enhanced parallel-processing capability); memory (e.g., solid-state memory devices such as DRAM, SRAM, SSD) and other storage devices (e.g., magnetic or optical disk) to store program code and data; user input devices (e.g., keyboards, pointing devices such as a mouse or touchpad, microphones); user output devices (e.g., display devices, speakers, printers); combined input/output devices (e.g., touchscreen displays); signal input/output ports; network communication interfaces (e.g., wired network interfaces such as Ethernet interfaces and/or wireless network communication interfaces such as Wi-Fi interfaces); and so on. In some embodiments, classical client 104 (or specific modules thereof) may be implemented using a server array or server farm to provide increased processing power (e.g., to speed up simulation of quantum circuits by verification module 130). In some embodiments, classical client 104 can include purpose-built processors to implement some or all of its modules. Thus, it should be understood that classical client 104 can have a distributed implementation in which different modules (or portions thereof) are implemented using physically distinct computer systems connected to each other via a bus, a local area network, or a wide area network (e.g., the internet). Further, in some embodiments classical client 104 may act as a server to provide certified random numbers (e.g., upon request or via broadcast) to other computer systems acting as clients.

Computer programs incorporating code to implement various modules of classical client 104 may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable media encoded with the program code may be packaged with a compatible computer system or other electronic device, or the program code may be provided separately from electronic devices (e.g., via Internet download or as a separately packaged computer-readable storage medium).

Certified random bit sequences of the type that can be generated using a system such as system 100 and/or a process such as process 200 have a number of practical applications, and random bit sequences generated in accordance with embodiments of the invention can be used in any context where verifiable randomness is desired. For instance, the NIST (National Institute of Standards and Technology) Randomness Beacon publicly offers a fresh set of 512 random bits every minute, and a similar public random-number service could be provided using processes of the kind described above. Other examples of applications include generating certified random numbers for private consumption, such as for use in games of chance (e.g., lotteries), random selection from a population (e.g., selecting individuals for tax audits, jury duty, or the like), proof-of-stake cryptocurrencies, setting parameters for cryptographic systems, and so on.

Embodiments described above rely on a number of parameters, the particular value of which can be chosen based on various design considerations, including the number of certified random bits that can be generated per challenge round and the overall performance measured as the number of certified random bits that can be generated per unit time. It should be understood that the invention is not limited to any particular choice of parameters; however, there is interplay among the parameters that should be understood when making selections. Examples of the interplay among parameters will now be described, to illustrate selection of parameter values so as to safely (i.e., while preventing spoofing) generate certified random bits. Two types of spoofing are considered: spoofing by a classical computer (referred to as "classical spoofing") and spoofing by a secretly-deterministic quantum computer (referred to as "quantum spoofing").

Table 1 summarizes parameters related to the number of certified random bits that can be generated per challenge round. Discussion of considerations related to selecting these parameters follows.

TABLE 1

| Parameter | Meaning |
|---|---|
| n | Number of qubits in the quantum computer |
| k | Number of n-bit samples (or result strings) to demand in each challenge round |
| b | Confidence parameter determining the threshold for satisfying Eq. (1) (1 ≤ b ≤ 2) |
| δ | Average fidelity of the quantum computer |
| d | Depth (e.g., number of layers) of the quantum circuit |
| L | "Hardness" parameter based on assumptions about the runtime of potential spoofing protocols. |
| p | Average probability of failing to produce at least H bits of min-entropy in a challenge round |
| q | Probability of the quantum computer satisfying Eq. (1), which depends on k, b, and δ; q can be used to select $f_{min}$ for Eq. (3) |
| H | Number of bits of min-entropy that can safely be extracted per challenge round (H ≤ n) |

The number of qubits (n) depends on available quantum computers. Quantum computers with n in the range of about 40 to 60 qubits exist now or are expected in the near future. It is contemplated that quantum computers with larger numbers of qubits may become available, and there is no particular limit on n. The preferred range for n also depends on the available classical computing power. Two considerations may come into play. First, n should be large enough that spoofing the quantum computer's output is expected to be prohibitively expensive. At present, n≥40 (for preventing classical spoofing) or n≥50 (for preventing quantum spoofing) is believed to be sufficient. Second, if n is too large, then simulating the quantum circuit during verification (e.g., at block 408 of process 400) becomes prohibitively expensive. At present, n≈80 is estimated as the upper limit. It should be understood that these limits may change in the future with the advent of more powerful classical and/or quantum computers.

The number of samples per challenge round (k) should be large enough that one can expect Eq. (1) to be satisfied with high probability in a given round. (For purposes of this analysis, "high probability" means that q is about 0.8 or higher.) For a fixed value of the threshold parameter b, a larger k results in larger q (by operation of the Law of Large Numbers). Larger q also results in extracting a larger number of random bits per round; thus, larger k may be preferred. However, larger k also requires a longer runtime for the quantum computer to generate the samples for a challenge round, which both decreases the number of certified random bits that can be generated per second and increases the risk that a spoofing attack could run in a similar amount of time. By way of illustration, to complete a challenge round in a given quantum computer may require a fixed startup time of ~0.1 s plus ~40 μs per sample.

It is also noted that H, the number of min-entropy bits that can be safely extracted per round, has an upper limit that is independent of the choice of k. As described below, the upper limit, based on known spoofing algorithms, is n (for preventing classical spoofing) or n/2 (for also preventing quantum spoofing). To safely extract more bits, additional rounds should be performed rather than further increasing k.

Given an ideal (noise-free) quantum computer (assumed to achieve b=2 and δ=1), k can be chosen as a small number, e.g., between about 5 and about 10. (Even k=1 would be acceptable.) In this case, a larger k can allow for a higher rate of random bits per round, up to the upper limit on H. Accordingly, given the fixed startup cost of loading a new challenge circuit into a quantum computer, time efficiency is improved by selecting a larger k (resulting in larger q). In some embodiments, k can be increased until the startup cost is no longer the dominant contributor to the quantum computer's runtime.

Given a noisy quantum computer (the type likely to be available in the near term), confidence parameter b may be only slightly larger than 1 (e.g., 1.01 or less). In this case, a larger k is needed to pass the test of Eq. (1) with probability q that is appreciably larger than a classical computer can achieve (so that spoofing can be detected). Based on standard statistical considerations, one rule of thumb that can be applied is $k \geq 1/(b-1)^2$. For example, if b≈1.002 (a realistic value at present), then k would be at least ~$10^5$. Larger values, e.g., a constant multiple of $1/(b-1)^2$, can also be selected, with large values leading to higher confidence of passing the verification test described above (which corresponds to a higher value of probability q) For example, if b≈1.002, k~$5 \times 10^6$ may be selected.

Confidence parameter b is closely connected with the fidelity of the quantum computer (δ). For present purposes, fidelity of a quantum computer can be quantified as the correlation between the quantum computer's output distribution and the ideal target distribution $D_C$ for a given quantum circuit. (This is different from, and typically much smaller than, the fidelities of individual gates in the quantum computer.) As a rough heuristic, the output of the quantum computer can be approximated as $(1-\delta)U + \delta D_C$, where U is the uniform distribution over n-bit strings. Fidelity depends on various contributors to noise, such as quantum decoherence, crosstalk between qubits, and errors in initialization and/or readout of the qubits. Accordingly, output can be determined empirically for various quantum circuits for which $D_C$ is known, and δ can be extracted from the measurements. It should also be noted that, since individual gate fidelity contributes to overall fidelity of the quantum computer, δ can be expected to fall off with the depth (d) of the quantum circuit. For instance, a rough approximation applicable to existing quantum computer technologies is that fidelity decreases roughly as $\sim 1/c^d$, where c is a constant that depends on the particular quantum hardware such that more accurate gates lead to smaller c.

Confidence parameter b can be chosen to optimize performance of the verification process. As described above with reference to process 400 of FIG. 4, a classical computer performing verification determines a probability score $P_i$ for a challenge round i according to Eq. (7), then applies Eq. (1) to the score as a verification test. Given an ideal quantum computer, for b arbitrarily close to 2, the quantum computer's outputs can pass this verification with a probability q that approaches 1 as k goes to infinity. Given a completely noisy quantum computer (where the output is uniformly random strings regardless of the quantum circuit), the expectation value of $P_i$ for each challenge round would be exactly $\frac{1}{2}^n$, and such a computer would be expected to pass the verification test of Eq. (1) with appreciable probability q only for b≤1. Given a realistically noisy quantum computer, passing the verification test of Eq. (1) is possible for b in the range 1≤b<2. In particular, a realistically noisy quantum computer with fidelity δ (as defined above) can be expected to pass the verification test of Eq. (1) with a probability q that approaches 1 as k goes to infinity, provided that b<1+δ.

Circuit depth (d) for the quantum circuit should be large enough that classical simulation algorithms, such as algorithms based on tensor networks, fail. In general, a larger depth leads to greater confidence that classical simulation algorithms (constrained by runtime as described above) will fail and a larger number of random bits per round. However, as noted above, for existing quantum computer technologies, fidelity δ decreases roughly as $\sim 1/c^d$, and the number of samples k per challenge round scales roughly as $\sim 1/\delta^2$. Thus increasing d also requires increasing k, both of which result in increased runtime. Accordingly, choosing d to be small while providing confidence that classical simulation algorithms will fail may be preferred. For example, a depth that is at least 2 to 3 times the diameter Δ of the network of qubits (defined as the maximum number of nearest-neighbor hops needed to get from any qubit to any other qubit in the network) may be taken as sufficient. For a 2D array of qubits, $\Delta \approx \sqrt{n}$ can be a good approximation. In one numerical example, for a 2D array of n=53 qubits, a circuit depth d=20 ($\approx 2.75 \times \sqrt{53}$) has been used. Fidelity δ ≈0.002 has been achieved for d=20, which leads to a manageable number of samples k~$10^5$ to ~$10^6$.

Hardness parameter L is a theoretical parameter related to the minimum runtime (e.g., number of computational steps) of a hypothetical algorithm that could spoof the quantum computer. The value of L can be selected based on working assumptions about what sorts of classical or quantum algorithms for spoofing the behavior of the presumed quantum computer exist or might come into existence. Ignoring other dependencies, the number H of min-entropy bits that can be safely extracted per round scales with L like H=$c_1$ $\log_2$(L)−$c_2$ $\log_2$ (n), where $c_1$ and $c_2$ are constants (incorporating other dependencies) such that 0<$c_1$<1 and $c_2$>0.

Based on known algorithms, an upper bound can be placed on L. More specifically, L should satisfy L≤$2^n$ where only classical spoofing is of concern and L≤$2^{n/2}$ where quantum spoofing is also a concern. In general, L can be determined with reference to a "long list quantum supremacy verification" (LLQSV) problem, which can be stated as follows: Given a set of M=$2^{3n}$ quantum circuits {$C_i$, =1, . . . M} independently drawn from a probability distribution of quantum circuits, and given a set of n-bit strings {$s_i$, =1, . . . M}, the LLQSV problem is to distinguish a "No" case, in which each $s_i$ was drawn independently from {0, 1}$^n$ from a "Yes" case in which each $s_i$ was drawn independently from $D_{C_i}$, where $D_{C_i}$ is the output distribution of quantum circuit $C_i$. Existing algorithms can solve the LLQSV problem, e.g., using an Arthur-Merlin protocol, in $2^n n^{O(1)}$ time (classical) and $2^{n/2} n^{O(1)}$ time (quantum); hence the upper bound on L noted above. This upper bound leads to H=n−$c_2$ $\log_2$(n) in cases where only classical spoofing is a concern or H=n/2−$c_2$ $\log_2$(n) where quantum spoofing is also a concern.

An extremely aggressive choice of L (e.g., equal to the upper bound) would maximize the number H of bits per round. However, if the corresponding hardness assumption turned out to be false (i.e., if the LLQSV problem turned out to be solvable by an algorithm in fewer than L steps), then the presumed random bits could have been spoofed by a non-random algorithm and therefore could be predictable. Accordingly, a less aggressive choice of L may be desirable. At the opposite extreme, a weak assumption about hardness can be made where L=$n^\gamma$ for a constant γ>1. This assumption leads to fewer random bits per round but less risk of undetected spoofing. Any L in the range between the upper bound and the weakest assumption that yields H bounded above zero can be used.

Failure probability p represents the average probability of failing to produce at least H bits of min-entropy in a challenge round. Parameter q is the probability that the quantum computer's samples pass the verification test of Eq. (1) in a given round, averaged over all possible challenge circuits C. As such, q depends on b, k, and the empirical fidelity δ. Given the latter three quantities, one could produce an analytic or theoretical estimate for q, under the further assumption that the k samples are independent. If the samples are not independent, then q could differ from the theoretical prediction, and an empirical estimation may be used. Under above-stated assumptions about the hardness of the LLSQV problem, H bits of min-entropy can be safely extracted in the challenge round, with success probability of at least 1−p, if the inequality p>b(1−q)/(b−1) is satisfied.

H, the number of bits of certified min-entropy per round, can be regarded as the central parameter characterizing performance; it is a reasonable proxy for bits per second as long as k (which determines the runtime of the quantum computer) is not too large. Combining two inequalities stated above, and assuming that security against quantum spoofing is desired (and that L=$2^{n/2}$ provides such security), the maximum number of certified random bits per round that can be produced would be:

$$H \le [(bq - 1)/(b - 1) - c_1][\log_2(L) - c_2 \log_2(n)] \le \qquad (8)$$
$$\frac{n}{2}(bq - 1)/(b - 1) \le \frac{n}{2}$$

for $c_1$, $c_2$>0. It is noted that generating certified random bits (i.e., H>0) requires that bq>1.

The amount of time needed to produce H certified random bits depends on k and also depends on the amount of time needed for the quantum computer to execute each quantum circuit (which depends on circuit depth d), the startup time needed to load each new quantum circuit into the quantum computer, and the communication latency (e.g., Internet latency) associated with sending a new quantum circuit to the quantum computer and the quantum computer sending back the corresponding results.

In view of the above, there is a tradeoff between the performance of the quantum computer and the rate of random bit generation. More specifically, the lower the fidelity δ (which is defined as at least zero) of the quantum computing hardware, the closer b (which has an upper limit of approximately 1+δ and a lower limit of 1) will need to be to 1. But the closer b is to 1, the closer q (the probability of satisfying Eq. (1)) also needs to be to 1, in order to satisfy bq>1. In turn, the closer q is to 1 (and also the smaller is δ), the larger k needs to be in order for the k returned samples to satisfy Eq. (1) with probability at least q. And, the more samples k need to be taken per round, the fewer certified random bits can be generated per unit time. By way of a numerical example, suppose that δ=0.002 and b=1.002. Then q needs to be at least about 0.998, and k needs to be in the hundreds of thousands or millions. If each sample takes ~40 microseconds, this means that each round would take between 10 seconds and several minutes. Each round, in turn, might lead to around 5-10 bits of certified min-entropy once the various considerations above are taken into account.

Other parameters, such as the total number of rounds (T), the number of rounds selected for performing verification ($T_v$ in process 400), the number of seed bits used to generate the quantum circuits C for the challenge rounds, and the number of seed bits used for the seeded randomness extractor (e.g., at block 212 of process 200), have less effect on performance and may be selected as desired. It is noted that the total number of certified random bits produced across all challenge rounds is expected to scale linearly with the number of challenge rounds, although a larger number of challenge rounds may justify a more conservative hardness assumption (e.g., a lower value of hardness parameter L). The number of verification rounds $T_v$ can be a small fraction of T or a constant (e.g., 10 or 20 rounds) while maintaining high statistical confidence that a large amount of min-entropy, scaling linearly with T, is being generated. The number of seed bits used to generate challenge circuits can scale like log (L), and the number of seed bits used in the seeded randomness extractor can scale like log (nT).

While the invention has been described with reference to specific embodiments and examples, those skilled in the art with access to the present disclosure will recognize that variations and modifications are possible. For example, while some embodiments use a NISQ as the quantum computer, other types of quantum computers can be substituted. Parameters used in verification (e.g., k, b, $f_{max}$, and $T_v$) can be selected according to the properties of whatever quantum computer a given quantum server purports to have. The size of the quantum computer (i.e., the number n of qubits) can also be varied as desired, provided that simulation of the quantum circuit by a classical computer is computationally tractable (which, as a practical matter, sets an upper limit on n) and takes substantially more time (e.g., by two or three orders of magnitude or more) than the time limit $\tau_{max}$ set for the quantum computer to respond to a request (which, as a practical matter, sets a lower limit on n). For example, based on existing internet communication technologies, for n less than about 40, the time required to spoof the quantum computer using known classical computers might not be substantially longer than internet communication latency, so setting a time limit low enough to preclude spoofing would be possible only if a fast communication path (e.g., latency less than about a millisecond) is available between the quantum server and classical client. For n greater than about 80, the verification process, which involves simulating the quantum circuit using a classical computer, could become unacceptably slow (or even intractable) for existing classical computers; however, larger values of n can be used if sufficient classical computing resources are available and if the resulting verification delays are acceptable.

Thus, although the invention has been described with respect to specific embodiments, it will be appreciated that the invention is intended to cover all modifications and equivalents within the scope of the following claims.

What is claimed is:

1. A computer system comprising:
   a quantum circuit generator module to generate an apparently-random quantum circuit;
   a communication module to send the apparently-random quantum circuit as a challenge to a quantum server that includes a quantum computer and to receive a response to the challenge from the quantum server, wherein the response includes a result string representing output from executing the apparently-random quantum circuit on the quantum computer and wherein the communication module requires the response within a time limit that is sufficiently short to preclude spoofing of the quantum computer;
   a verification module to determine whether to accept that a set of received responses was generated by using the quantum computer to execute the apparently-random quantum circuit, wherein the determination is based on a set of received responses to a plurality of challenges for each of a plurality of apparently-random quantum circuits generated by the quantum circuit generator module, and wherein the determination includes a classical simulation of each of the plurality of apparently-random quantum circuits; and
   a randomness extraction module to generate a random bit sequence using one or more of the result strings.

2. The computer system of claim 1 further comprising:
   a seed module to obtain a random seed; and
   a pseudorandom number generator module to generate a sequence of pseudorandom numbers from a seed obtained by the seed module,
   wherein the quantum circuit generator module is configured to use a pseudorandom number generated by the pseudorandom number generator module to generate the apparently-random quantum circuit.

3. The computer system of claim 1 wherein the quantum circuit generator module is configured such that the apparently-random quantum circuit includes a set of arbitrary unitary transformations to be applied to an ensemble of qubits of the quantum computer.

4. The computer system of claim 1 wherein the communication module is configured to send a plurality of challenges in a plurality of challenge rounds, wherein each challenge round includes sending one of a plurality of apparently-random quantum circuits generated by the quantum circuit generator module to the quantum sever for execution a number k of times and receiving a set of k result strings each one of the plurality of apparently-random quantum circuits.

5. The computer system of claim 4 wherein the time limit is based on an estimated time to configure the quantum computer to execute the apparently-random quantum circuit, an estimated time to execute the apparently-random quantum circuit, and an estimated communication latency between the computer system and the quantum server and is sufficiently short to preclude spoofing of the quantum computer.

6. The computer system of claim 4 wherein the verification module is configured such that the determination whether to accept that a set of received responses was generated by using the quantum computer to execute the apparently-random quantum circuit includes:
   simulating the apparently-random quantum circuit (C) for each of the challenge rounds using the computer system;
   determining, for each of the k result strings ($s_j$) for the challenge, a probability $Pr(s_j|C)$ of an error-free quantum computer producing the result string $s_j$ given the apparently-random quantum circuit C;
   computing a probability score for each of the challenge rounds, wherein the probability score is a sum of the probability $Pr(s_j|C)$ over all of the k result strings $s_j$; and
   comparing the probability score for each of the challenge rounds to a threshold.

7. The computer system of claim 6 wherein the threshold is given by $bk/2^n$, wherein n is the number of qubits of the quantum computer and b is a confidence parameter such that $1 \le b \le 2$.

8. The computer system of claim 6 wherein the verification module is further configured such that determining whether to accept that a set of received responses was generated by using the quantum computer to execute the apparently-random quantum circuit further includes:
counting a number ($N_P$) of the challenge rounds for which the probability score is at least equal to the threshold; and
determining whether a pass fraction $N_P/T$ is at least equal to a minimum fraction,
wherein the set of received responses is accepted as being generated by the quantum computer if the pass fraction $N_P/T$ is at least equal to a minimum fraction and not accepted otherwise.

9. The computer system of claim 1 further comprising:
a seed module to obtain a random seed; and
wherein the randomness extraction module implements a seeded randomness extractor, wherein inputs to the seeded randomness extractor include at least a portion of the random seed and at least one of the result strings received from the quantum server.

10. The computer system of claim 1 wherein the randomness extraction module is configured to generate a random bit sequence using all of the result strings received from the quantum server.

11. A method for generating certified random numbers, the method comprising:
conducting, by a classical client computer system, a plurality of challenge rounds with a quantum server that includes a quantum computer, wherein conducting each challenge round includes:
generating an apparently-random quantum circuit;
instructing the quantum server to execute the apparently-random quantum circuit on the quantum computer a number (k) of times; and
receiving from the quantum server, within a time limit, a set of k result strings representing output of the quantum computer from each execution of the apparently-random quantum circuit, wherein the time limit is sufficiently short to preclude spoofing of the quantum computer;
performing, by the classical client computer system, a verification test on the k result strings received during each challenge round of a subset of the challenge rounds that includes $T_v$ of the challenge rounds, wherein performing the verification test includes:
determining a probability score for each of the challenge rounds in the subset based on a probability of receiving each result string from an error-free quantum computer; and
comparing the probability score to a threshold; and
in the event that the verification test succeeds, using, by the classical client computer system, at least one of the result strings received during the plurality of challenge rounds to generate one or more certified random numbers.

12. The method of claim 11 wherein generating the apparently-random quantum circuit includes:
obtaining a random seed;
generating a pseudorandom number based on at least a portion of the random seed; and
using the pseudorandom number to generate a set of arbitrary unitary transformations to be applied to an ensemble of qubits of the quantum computer.

13. The method of claim 11 wherein instructing the quantum server to execute the apparently-random quantum circuit on the quantum computer a number (k) of times includes:
sending k separate requests to execute the apparently-random quantum circuit,
wherein a response including one of the k result strings is received for each one of the requests prior to sending a next one of the requests.

14. The method of claim 11 wherein using at least one of the result strings received during the plurality of challenge rounds to generate one or more certified random numbers includes using a seeded randomness extractor, wherein inputs to the seeded randomness extractor include a random seed and at least one of the result strings received from the quantum server.

15. The method of claim 11 wherein using at least one of the result strings received during the plurality of challenge rounds to generate one or more certified random numbers includes using all of the result strings received during the plurality of challenge rounds.

16. A computer-readable storage medium having stored therein program code instructions that, when executed by a processor in a classical computer system, cause the classical computer system to perform a method comprising:
conducting a plurality of challenge rounds with a quantum server that includes a quantum computer, wherein conducting each challenge round includes:
generating an apparently-random quantum circuit using a first portion of a random seed;
instructing the quantum server to execute the apparently-random quantum circuit on the quantum computer a number (k) of times; and
receiving from the quantum server, within a time limit, a set of k result strings representing output of the quantum computer from each execution of the apparently-random quantum circuit, wherein the time limit is sufficiently short to preclude simulation of the apparently-random quantum circuit by a classical computer;
performing a verification test on the k result strings received during each challenge round in a subset of the challenge rounds that includes a number ($T_v$) of the challenge rounds, wherein performing the verification test includes:
determining a probability score for each of the challenge rounds in the subset based on a probability of receiving each result string from an error-free quantum computer; and
comparing the probability score to a threshold; and
in the event that the verification test succeeds, using at least one of the result strings received during the plurality of challenge rounds to generate one or more certified random numbers.

17. The computer-readable storage medium of claim 16 wherein the time limit is based on an estimated time to configure the quantum computer to execute the apparently-random quantum circuit, an estimated time to execute the apparently-random quantum circuit, and an estimated communication latency between the classical computer system and the quantum server and is sufficiently short to preclude spoofing of the quantum computer.

18. The computer-readable storage medium of claim 16 wherein determining the probability score for each of the challenge rounds includes:
- simulating the apparently-random quantum circuit (C) for the challenge round using the classical computer system;
- determining, for each of the k result strings ($s_j$), a probability $Pr(s_j|C)$ of an error-free quantum computer producing the result string $s_j$ given the apparently-random quantum circuit C; and
- computing, as the probability score, a sum of the probability $Pr(s_j|C)$ over all of the k result strings $s_j$.

19. The computer-readable storage medium of claim 18 wherein the threshold is given by $bk/2^n$, wherein n is the number of qubits of the quantum computer and b is a confidence parameter such that $1 \leq b \leq 2$.

20. The computer-readable storage medium of claim 18 wherein performing the verification test further includes:
- counting a number ($N_P$) of challenge rounds for which the probability score is at least equal to the threshold; and
- determining whether a pass fraction $N_P/T$ is at least equal to a minimum fraction,
- wherein the verification test is passed if the pass fraction $N_P/T$ is at least equal to a minimum fraction and failed otherwise.

* * * * *